United States Patent [19]

Martz et al.

[11] Patent Number: 5,744,542
[45] Date of Patent: Apr. 28, 1998

[54] EMULSIFIERS AND THEIR USE IN WATER DISPERSIBLE POLYISOCYANATE COMPOSITIONS

[75] Inventors: Jonathan T. Martz, Shaler Township, Allegheny County; Joseph M. Carney, Reserve Township, Allegheny County; Robert E. Jennings, New Sewickley Township, Beaver County; Karen D. Donnelly, Hampton Township, Allegheny County, all of Pa.

[73] Assignee: PPG Industries, Inc., Pittsburgh, Pa.

[21] Appl. No.: 744,566

[22] Filed: Nov. 6, 1996

Related U.S. Application Data

[63] Continuation of Ser. No. 411,253, Mar. 27, 1995, abandoned.

[51] Int. Cl.$^6$ .................. C08J 3/00; C08K 3/20; C08L 75/00; C07C 261/00
[52] U.S. Cl. .................. 524/590; 524/507; 524/539; 524/591; 524/839; 524/840; 525/123; 525/131; 525/455; 528/44; 560/26; 560/115
[58] Field of Search .................. 524/507, 539, 524/591, 839, 840, 590; 525/123, 131, 455; 528/44; 560/26, 115

[56] References Cited

U.S. PATENT DOCUMENTS

| | | | |
|---|---|---|---|
| 3,996,154 | 12/1976 | Johnson et al. | 252/312 |
| 4,433,095 | 2/1984 | Hombach et al. | 524/563 |
| 4,436,862 | 3/1984 | Tetenbaum et al. | 524/445 |
| 4,446,256 | 5/1984 | Hicks | 523/402 |
| 4,472,550 | 9/1984 | Reiff et al. | 524/589 |
| 4,663,377 | 5/1987 | Hombach et al. | 524/196 |
| 4,798,745 | 1/1989 | Martz et al. | 525/207 |
| 4,798,746 | 1/1989 | Claar et al. | 427/407 |
| 4,870,151 | 9/1989 | Scholl et al. | 528/49 |
| 5,043,381 | 8/1991 | Coogan et al. | 524/591 |
| 5,075,370 | 12/1991 | Kubitza et al. | 524/591 |
| 5,182,355 | 1/1993 | Martz et al. | 528/75 |
| 5,191,012 | 3/1993 | Markusch et al. | 524/591 |
| 5,194,487 | 3/1993 | Jacobs | 524/840 |
| 5,200,489 | 4/1993 | Jacobs et al. | 528/49 |
| 5,202,377 | 4/1993 | Thorne et al. | 524/591 |
| 5,252,696 | 10/1993 | Laas et al. | 528/49 |
| 5,296,160 | 3/1994 | Tirpak et al. | 252/182.2 |
| 5,300,556 | 4/1994 | Tirpak et al. | 524/591 |
| 5,331,039 | 7/1994 | Blum et al. | 524/507 |
| 5,373,050 | 12/1994 | Morikawa et al. | 524/591 |
| 5,380,792 | 1/1995 | Renk | 524/840 |
| 5,387,367 | 2/1995 | Haeberle et al. | 252/182.22 |
| 5,389,718 | 2/1995 | Potter et al. | 524/591 |
| 5,389,720 | 2/1995 | Markusch et al. | 524/839 |

FOREIGN PATENT DOCUMENTS

| | | |
|---|---|---|
| 2085495 | 6/1993 | Canada . |
| 2088805 | 8/1993 | Canada . |
| 63-216070 | 12/1989 | Japan . |
| 1-216070 | 4/1991 | Japan . |

OTHER PUBLICATIONS

Isocyanates, Organic; Encyclopedia of Chemical Technology, vol. 13, pp. 789–817.

*Primary Examiner*—Patrick D. Niland
*Attorney, Agent, or Firm*—Dennis G. Millman; Paul S. Chirgott

[57] ABSTRACT

An aqueous two-component polyisocyanate coating composition is based on an essentially isocyanate-free emulsifier that comprises the reaction product of:

(i) an isocyanate and (ii) a member selected from the group consisting of: hydroxy functional polyalkyl ethers containing at least five ethylene oxide, alcohols different from said polyalkyl ethers, amine compounds, and combinations thereof. The hydroxy functional polyalkyl ether is provided in a quantity sufficient to react at least one equivalent of isocyanate groups in polyisocyanate (i), and the total amounts of reactants (ii) are sufficient to react all of the isocyanate groups of the polyisocyanate (i).

29 Claims, No Drawings

EMULSIFIERS AND THEIR USE IN WATER DISPERSIBLE POLYISOCYANATE COMPOSITIONS

This application is a continuation of application Ser. No. 08/411,253 filed Mar. 27, 1995 now abandoned.

FIELD OF THE INVENTION

This invention relates to emulsifiers, their preparation and use in water dispersible polyisocyanate compositions, and to aqueous, two-component coating compositions incorporating the water dispersible polyisocyanate compositions and emulsifiers in combination with an aqueous, polymeric resin having isocyanate-reactive groups.

BACKGROUND OF THE INVENTION

The use of water based coatings, as opposed to solvent based coatings, has become increasingly more important due to environmental considerations. However, in the case of isocyanate-reactive coatings, the presence of water presents a problem in that the isocyanate groups react not only with the isocyanate-reactive groups with which they are intended to react, but also with the water as well. In order to overcome this disadvantage, the prior art has made use of emulsifiers that are the reaction product of polyisocyanates and hydroxy functional polyethers such that the emulsifier retains latent isocyanate functionality to assist in the crosslinking reaction of the coating and sufficient hydrophilic character to keep the coating composition dispersed in an aqueous medium.

U.S. Pat. No. 3,996,154 discloses emulsion of an aromatic polyisocyanate in water using an isocyanate functional, non-ionic surface active agent containing oxyethylene groups. U.S. Pat. No. 4,472,550 provides for similar emulsions that are useful as binders, where the isocyanate functional emulsifier is based on a variety of polyisocyanates. U.S. Pat. Nos. 4,665,377 and 5,296,160 disclose polyisocyanate compositions suitable for dispersion in water, which contain isocyanate functional emulsifiers. U.S. Pat. No. 5,200,489 is directed to a polyisocyanate composition that is dispersible in water with an average isocyanate functionality of 2 to 6 prepared by reacting a 1,6-hexamethylene diisocyanate based polyisocyanate adduct and an emulsifier based on the polyisocyanate adduct or another polyisocyanate and a monohydroxy functional polyether, such that the polyisocyanate composition in combination with an isocyanate-reactive aqueous polymer resin provides a coating composition. U.S. Pat. No. 5,252,696 relates to the composition and preparation of water-dispersible polyisocyanate mixtures having an average isocyanate functionality of 1.8 to 4.2 and containing cycloaliphatically bound isocyanate and ethylene oxide groups.

The use of isocyanate functional materials often requires that precautions be taken with respect to handling and use based on sensitization and toxicity considerations. Such precautions can be relatively burdensome when the coating compositions are utilized under controlled factory conditions, for example, manufacturing of automobiles. Automotive refinishing coatings, however, tend to be applied under conditions that are not nearly as controlled as in automobile plants.

In addition, the synthesis and production of novel isocyanate compounds and compositions has come under strict regulation by governmental agencies, and therefore it is increasingly difficult to obtain clearance for manufacture of new materials, especially those that fall into the categories of compounds including isocyanates.

Therefore, there is a need for polyisocyanate based emulsifiers that contain substantially no isocyanate-reactive groups, preferably none, in order to readily disperse the aqueous, two-component, isocyanate-reactive coatings in water while maintaining the superior performance properties of these coatings. It would also be beneficial if a wide range of polyisocyanates could be employed in the preparation of the emulsifier.

SUMMARY OF THE INVENTION

One aspect of the present invention is an emulsifier that comprises the reaction product of:

(i) an isocyanate and
(ii) a member selected from the group consisting of: hydroxy functional polyalkyl ethers containing at least five ethylene oxide groups, alcohols different from said polyalkyl ethers, amine compounds, and combinations thereof. The hydroxy functional polyalkyl ether is provided in a quantity sufficient to react at least one equivalent of isocyanate groups in polyisocyanate (i), and the total amounts of reactants (ii) are sufficient to react all of the isocyanate groups of the isocyanate (i), i.e., at least 99 percent of the isocyanate groups originally present in the isocyanate component (i). The isocyanate composition (i) is preferably a polyisocyanate.

The present invention is also includes an aqueous polyisocyanate composition, as well as an aqueous two-component coating. The polyisocyanate composition (I) comprises a polyisocyanate (a) and the substantially isocyanate-free emulsifier (b) described above, wherein that the emulsifier (b) is present in an amount of from 5 to 75, preferably 15 to 40, percent by weight based on the resin solids weight of (a) plus (b). The aqueous two-component coating composition comprises the polyisocyanate composition (I) and an aqueous polymer resin (II) that contains isocyanate-reactive groups, wherein the components (I) and (II) are present in an amount sufficient to provide an equivalent ratio of isocyanate groups to isocyanate-reactive groups of about 0.5:1 to 5:1, preferably 0.8:1 to 2:1. The isocyanate reactive groups are preferably hydroxyl groups and/or amine groups.

DETAILED DESCRIPTION OF THE INVENTION

The emulsifiers of the present invention are the reaction product of an isocyanate and a hydroxy functional polyalkyl ether. Any organic isocyanate may be used, and suitable isocyanates would include known aliphatic, cycloaliphatic, aromatic and heterocyclic isocyanates. Examples of suitable isocyanates for preparing the emulsifier include phenyl isocyanate, octyl isocyanate, p-butyl phenyl isocyanate, o- and p-methoxy isocyanate, o-isocyanate benzyl chloride, cyclohexyl isocyanate, octyl isocyanate, octadecyl isocyanate, and chlorohexyl isocyanate. Preferred are polyisocyanates such as ethylene diisocyanate, 1,4-tetramethylene diisocyanate, 1,6-hexamethylene diisocyanate (HDI), 2,4,4-tri-methyl-1,6-hexamethylene diisocyanate, 1,12-dodecane diisocyanate, cyclobutane-1,3-diisocyanate, cyclohexane-1,3-diisocyanate, cyclohexane-1,4-diisocyanate, 1-isocyanato-2-isocyanatomethyl cyclopentane, 1-isocyanato-3,3,5-trimethyl-5-isocyanatomethyl cyclohexane (isophorone diisocyanate or IPDI), 2,4-hexahydrotoluylene diisocyanate, 2,6-hexahydrotoluylene diisocyanate, 2,4'-dicyclohexylhexylmethane diisocyanate, 4,4'-dicyclohexylmethane diisocyanate, 1,3-phenylene diisocyanate, 1,4-phenylene diisocyanate, 2,4-toluylene diisocyanate (TDI), 2,6-toluylene diisocyanate, diphenyl methane-2,4'-diisocyanate, diphenyl methane-4,4'-diisocyanate (MDI), naphthalene-1, 5-diisocyanate, triphenyl methane-4,4',4"-triisocyanate, polyphenylene polyisocyanates and mixtures thereof. Also suitable are polyisocyanates containing carbodiimide groups, urethane groups, allophanate groups, isocyanurate groups, biuret groups, and urea groups. A particularly useful polyisocyanate for making the emulsifier of the present invention is the isocyanurate of isophorone diisocyanate.

The polyisocyanate is reacted with hydroxy functional polyalkyl ether which may be mono-, di- or tri-functional, although monohydroxy functional polyalkyl ethers are preferred. Examples of hydroxy functional polyalkyl ethers include glycol ethers that are made by reacting at least five moles of alkylene oxide groups with an alcohol. Examples of suitable hydroxy functional polyalkyl ethers include polyethylene glycol monomethyl ether, 1-isobutyl isopentyloxy poly(ethyleneoxy)ethanol, octylphenoxy poly (ethyleneoxy) ethanol, nonylphenoxy poly(ethyleneoxy) ethanol, and the like, including mixtures thereof.

In addition to the polyisocyanate and the hydroxy functional polyalkyl ether described above, an optional third reactant may be used to make the emulsifier of the present invention when polyisocyanates are used. This optional third ingredient preferably may be an alcohol, a glycol ether, an amine, or combinations thereof. These alcohols, glycol ethers and amines may be aliphatic, cycloaliphatic, or aromatic and may be primary or secondary. Suitable alcohols are those containing 1 to 12 carbon atoms, preferably 1 to 4 carbon atoms, such as, methanol, ethanol, propanol, butanol, cyclohexanol and phenol. Glycol ethers that are suitable as the optional third reactant are generally characterized by shorter alkylene oxide chain length (i.e., they need not have at least five alkylene oxide groups) and include mono-, di- and, tri-and poly- ethylene and propylene glycol ethers, preferably ethylene glycol ethers, based on the isomers of methyl, ethyl, propyl, butyl and phenyl alcohols. Particular examples of the optional glycol ethers are ethylene glycol methyl ether, ethylene glycol ethyl ether, ethylene glycol butyl ether, ethylene glycol hexyl ether, diethylene glycol methyl ether, diethylene glycol ethyl ether, diethylene glycol butyl ether, triethylene glycol methyl ether, triethylene glycol ethyl ether, triethylene glycol butyl ether, polyethylene glycol monomethyl ether, propylene glycol methyl ether, dipropylene glycol methyl ether, dipropylene glycol dimethyl ether, tripropylene glycol methyl ether, propylene glycol isobutyl ether, ethylene glycol phenyl ether, propylene glycol phenyl ether. Examples of amines useful as the optional third reactant include butyl amine, ethylene diamine, diethylene triamine, triethylene tetramine, 1,6-hexanediamine, piperazine, 2,5-dimethyl piperazine, 1,4-cyclohexanediamine, 1,2-propane diamine, hydrazine, methylamine, tetramethylenediamine, ethanolamine, diethanolamine, triethanolamine aniline, phenylenediamine, 2,4- and 2,6-toluyldiamine, polyphenylene polymethylene polyamines, and mixtures thereof. Other classes of compounds that may server as the optional third reactant include mercaptans, oximes, acetoacetates, sulfonate diols, and piperadines.

The emulsifier may be prepared by conventional polymerization techniques, either batch-wise by combining all of the ingredients, or step-wise by reacting the polyisocyanate and hydroxy functional polyalkyl ether, followed by addition of the optional alcohol, glycol ether and/or amine reactant. When the optional third reactants include an amine, it is preferred to add the amine after the polyisocyanate, hydroxy functional polyalkyl ether and any optional alcohol and/or glycol ether have been reacted. Typically the reaction mixture is heated to obtain a homogeneous mixture at temperatures of about 60° C. to 80° C., preferably 70° C. to 75° C., until infrared analysis indicates that no isocyanate functionality remains. Although, in principle, it is intended that all of the isocyanate functionality of the polyisocyanate be reacted, it should be understood that 100 percent complete reaction cannot always be attained, and therefore, trace amounts of unreacted isocyanate should not be considered as being outside the scope of the present invention. Alternatively, reacting "all" of the isocyanate for the purposes of the present invention may be defined as being at least 99 percent complete reaction, preferably 100 percent.

The resulting emulsifiers typically have a total solids content, based on total weight of the emulsifier composition, between about 65 to 100 percent. The number average molecular weight of the emulsifier of particular embodiments has been found to be between 1000 and 4000 as determined by gel permeation chromatography utilizing a polystyrene standard.

The emulsifier described above may be used to prepare a polyisocyanate composition by mixing the emulsifier with a polyisocyanate compound. Polyisocyanate compounds useful for inclusion in the polyisocyanate composition may be the same polyisocyanates previously mentioned in connection with the synthesis of the emulsifier. Polyisocyanates based on an isocyanurate or biuret are preferred, with the isocyanurate of isophorone diisocyanate and the biuret of 1,6-hexamethylene diisocyanate being particularly useful examples. Typically, the polyisocyanate and emulsifier are blended with an organic solvent and agitated until a homogeneous solution is obtained. Suitable solvents are those that are not reactive with the polyisocyanate, such as ketones, acetates, and toluene. The polyisocyanate composition may be comprised of 5 to 75 percent by weight of the emulsifier, preferably 15 to 40 percent, most preferably 25 to 35 percent, based on resin solids weights.

The above polyisocyanate composition containing the emulsifier of the present invention may constitute one component of an aqueous two-component coating composition. The other component of such a two-component coating comprises an aqueous or water dispersible resin that contains a polymer having isocyanate-reactive groups, for example hydroxyl groups and/or amine groups. The polymers that are useful for this purpose include those known in the art for use in isocyanate cured coatings. Examples of suitable polymers include hydroxyl functional and/or amine functional acrylic polymers, polyester polymers, polyurethane polymers, and polyaldimines. The aqueous polymer resin component may also contain optional ingredients and additives conventionally used in the coatings industry. Typical additives include solvents, pigments, catalysts, defoamers, thickeners, and surfactants.

Prior to application of the aqueous two-component coating composition, the polyisocyanate composition package may be added to the aqueous polymer resin package under slow and constant agitation. The two components may be combined in relative amounts sufficient to provide a ratio of isocyanate groups to isocyanate-reactive groups of 0.5:1 to 5:1, preferably 0.8:1 to 2:1. The aqueous two-component coating composition may then be applied by spraying or other suitable application technique onto a substrate, typically metal or plastic, and cured under ambient conditions.

Typically, the two-component coating composition includes the emulsifier in the same component containing the polyisocyanate composition. Alternatively, the emulsifier may be included in the component containing the isocyanate-reactive resin instead of in the component containing the polyisocyanate. In another option, the aqueous diluent may be separate from the first and second components, and may be contained in a third component, which may also include some of the optional additives. For example, in a three-component composition the emulsifier and isocyanate-reactive resin may be in component one, the polyisocyanate in component two, and an aqueous diluent portion with optional additives in component three. An alternative three-component example the isocyanate-reactive resin may be in component in component one, the emulsifier and polyisocyanate in component two, and an aqueous diluent portion with optional additives in component three.

Aqueous or water dispersible two or three-component coating compositions utilizing the emulsifier of the present invention have excellent properties and performance when cured. These emulsifiers permit polyisocyanates to be readily incorporated into aqueous or water dispersible polymer resins without the need for rigorous agitation.

EXAMPLES

This invention is further illustrated by, but is not intended to be limited to, the following examples. All parts and percentages are by weight unless otherwise specified.

The following Examples A through E illustrate the preparation of emulsifiers in accordance with the present invention.

Example A

Preparation of an emulsifier

A reaction vessel equipped with a stirrer, condenser, temperature probe and nitrogen inlet was charged with 0.36 grams of dibutyltin dilaurate (available from Air Products and Chemicals, Inc.), 120.0 grams (0.50 equivalents) of the isocyanurate of isophorone diisocyanate ("IPDI T-1890" available from Huls America), 60.5 grams dipropylene glycol dimethyl ether solvent ("PROGLYDE DMM" available from the Dow Chemical Company), 60.5 grams methyl ethyl ketone, 40.0 grams (0.05 equivalents) polyethylene glycol monomethyl ether ("CARBOWAX 750 ME" available from Union Carbide Chemicals and Plastics Company) and 200.1 grams (0.45 equivalents) 1-isobutyl isopentyloxy polyethyleneoxyethanol ("SOLVACTANT DMH-7" available from Union Carbide Chemicals and Plastics Company) and heated to 60° to 65° C. The contents of the reaction vessel were stirred until the solid IPDI T-1890 was dissolved. The reaction contents were then heated to 70° to 75° C. and stirred until infrared analysis showed no evidence of isocyanate. The resulting product had a total solids content measured at 110° C. for one hour of 80.2% by weight, a Brookfield viscosity of 501 centipoise (cps) measured at 60 revolutions per minute (rpm) using a number 4 spindle, and a number average molecular weight of 2252 as determined by gel permeation chromatography utilizing a polystyrene standard.

Example B

Preparation of an emulsifier with optional monoalcohol and amine

A reaction vessel equipped with a stirrer, condenser, temperature probe and nitrogen inlet was charged with 0.55 grams of dibutyltin dilaurate, 240.0 grams (1.0 equivalents) polyisocyanate "IPDI T-1890," 92.1 grams dipropylene glycol dimethyl ether, 92.1 grams methyl ethyl ketone, 80.0 grams (0.11 equivalents) "CARBOWAX 750ME" and 200.1 grams (0.45 equivalents) "SOLVACTANT DMH-7," and heated to 60° to 65° C. The contents of the reaction vessel were stirred until the solid "IPDI T-1890" was dissolved. Then 32.1 (0.45 equivalents) grams diethylamine were added to the reaction, and the contents were stirred until infrared analysis showed no evidence of isocyanate. The resulting product had a total solids content measured at 110° C. for one hour of 78.2% by weight, a Brookfield viscosity of 1010 centipoise (cps) measured at 60 rpm using a number 4 spindle, and a number average molecular weight of 2448 as determined by gel permeation chromatography utilizing a polystyrene standard.

Example C

Preparation of an emulsifier with optional monoalcohol

A reaction vessel equipped with a stirrer, condenser, temperature probe and nitrogen inlet was charged with 0.36 grams of dibutyltin dilaurate, 192.0 grams (0.80 equivalents) polyisocyanate IPDI T-1890, 59.8 grams dipropylene glycol dimethyl ether, 59.8 grams methyl ethyl ketone, 64.0 grams (0.09 equivalents) polyethylene glycol 750 monomethyl ether ("CARBOWAX 750ME" available from the Union Carbide Chemicals and Plastics Company), 102.9 grams (0.71 equivalents) propylene glycol phenyl ether (available as "DOWANOL PPh" from the Dow Chemical Company) and heated to 60° to 65° C. The contents of the reaction vessel were stirred until the solid "IPDI T-1890" was dissolved. The reaction contents were then heated to 70° to 75° C. and stirred until infrared analysis showed no evidence of isocyanate. The resulting product had a total solids content measured at 110° C. for one hour of 75.4% by weight, a Brookfield viscosity of 67,600 centipoise (cps) measured at 12 rpm using a number 5 spindle, and a number average molecular weight of 1335 as determined by gel permeation chromatography utilizing a polystyrene standard.

Example D

Preparation of an emulsifier with optional monoalcohol

A reaction vessel equipped with a stirrer, condenser, temperature probe and nitrogen inlet was charged with 0.36 grams of dibutyltin dilaurate, 120.0 grams (0.50 equivalents) polyisocyanate "IPDI T-1890," 60.5 grams dipropylene glycol dimethyl ether, 60.5 grams methyl ethyl ketone, 40.0 grams (0.05 equivalents) "CARBOWAX 750ME," and 202.8 grams (0.45 equivalents) "Igepal CO-530" (nonylphenoxy poly(ethyleneoxy) ethanol available from Rhone-Poulenc) and heated to 60° to 65° C. The contents of the reaction vessel were stirred until the solid "IPDI T-1890" was dissolved. The reaction contents were then heated to 70° to 75° C. and stirred until infrared analysis showed no evidence of isocyanate. The resulting product had a total solids content measured at 110° C. for one hour of 79.1% by weight, a Brookfield viscosity of 1000 centipoise (cps) measured at 60 rpm using a number 5 spindle, and a number average molecular weight of 2147 as determined by gel permeation chromatography utilizing a polystyrene standard.

Example E

Preparation of an emulsifier with optional monoalcohol

A reaction vessel equipped with a stirrer, condenser, temperature probe and nitrogen inlet was charged with 0.35 grams of dibutyltin dilaurate, 120.0 grams polyisocyanate "IPDI T-1890" (0.50 equivalents), 60.5 grams dipropylene glycol dimethyl ether, 58.4 grams methyl ethyl ketone, 58.4 grams "CARBOWAX 750ME" (0.05 equivalents), and 190.3 grams (0.45 equivalents) "Igepal CA-520" (octylphenoxy poly(ethyleneoxy) ethanol available from Rhone-Poulenc) and heated to 60° to 65° C. The contents of the reaction vessel were stirred until the solid "IPDIT-1890" was dissolved. The reaction contents were then heated to 70° to 75° C. and stirred until infrared analysis showed no evidence of isocyanate. The resulting product had a total solids content measured at 110° C. for one hour of 79.1% by weight, a Brookfield viscosity of 1000 centipoise (cps) measured at 60 rpm using a number 5 spindle, and a number average molecular weight of 2147 as determined by gel permeation chromatography utilizing a polystyrene standard.

The following Example F describes an embodiment of acrylic amine polymer that is used as the isocyanate-reactive binder resin in the coating examples set forth herein.

Example F

Preparation of acrylic amine binder

The following initial charge and feeds were used in the preparation of aqueous secondary amine functional acrylic polymer via solution polymerization technique.

| Ingredients | Parts by Weight |
|---|---|
| *Initial Charge* | |
| Isopropanol | 650.0 |
| *Feed 1* | |
| Isopropanol | 565.0 |
| n-Butyl acrylate | 273.5 |
| Methyl methacrylate | 783.5 |
| Tert-butylaminoethyl methacrylate | 364.5 |
| Styrene | 401.0 |
| VAZO-67[1] | 91.0 |
| *Feed 2* | |
| Acetic acid | 88.5 |
| *Feed 3* | |
| Deionized water | 5425.0 |

[1] 2,2'-Azobis(2-methylbutanenitrile) initiator commerically available from E. I. du Pont de Nemours and Company, Wilmington, Delaware.

The initial charge was heated in a reactor with agitation to reflux temperature (81° C.). Then Feed 1 was added in a continuous manner over a period of 3 hours. At the completion of Feed 1, the reaction mixture was held at reflux for 3 hours. The resultant acrylic polymer had a total solids content of 59.8 percent determined at 110° C. for one hour and number average molecular weight of 4833 as determined by gel permeation chromatography (GPC) using polystyrene as standard.

Following the polymerization, Feed 2 was added over 10 minutes at room temperature with agitation. After the completion of the addition of Feed 2, Feed 3 was added over 15 minutes. Then the reaction mixture was heated for azeotropic distillation of isopropanol. When the distillation temperature reached 99°–100° C., the distillation continued two more hours and then the reaction mixture was cooled to room temperature. The total distillate collected was 2545 grams. After filtration the final aqueous dispersion had a solid content of 31.5 percent and pH of 5.32.

Examples 1 through 5 are embodiments of two-component coating compositions in accordance with the present invention. In each of these Examples, Package 1 is an aqueous component containing an isocyanate-reactive polymer, and Package 2 is a polyisocyanate composition containing one of the emulsifiers of Examples A through E. The performance test results of these coatings are set forth in Table I.

EXAMPLE 1

| Component | Weight Percent |
|---|---|
| Package 1 | |
| Acrylic amine of Example F | 40.16 |
| Solsperse 27000[2] | 0.37 |
| DSX-1514[3] | 0.35 |
| Dee Fo 97-3[4] | 0.11 |
| Exxate 900[5] | 3.03 |
| n-Propanol[6] | 0.18 |
| Deionized water | 20.51 |
| Raven 410[7] | 0.04 |
| Microtalc MP-12-50[8] | 9.57 |
| Barimite XF[9] | 9.89 |
| Ti-Pure R902-38[10] | 11.25 |
| Sub Total | 95.46 |
| Package 2 | |
| Desmodur N 3200[11] | 2.72 |
| Emulsifier of Example A | 1.14 |
| Exxate 900 | 0.68 |
| Sub Total | 4.54 |
| Total | 100.00 |

[2] Solsperse ® 27000 - Hyperdispersant available from ICI Surfactants, Wilmington, Delaware.
[3] DSX-1514 - Thickener available from Henkel, Kankakee, Illinois.
[4] Dee Fo ® 97-3 - Defoamer available form Ultra Additives, Inc., Paterson, New Jersey.
[5] Exxate ® 900 - Solvent available from Exxon Chemical Co., P.O. Box 2180, Houston, Texas.
[6] n-Propanol - Solvent available from Eastman Chemical Products, Inc., Kingsport, Tennessee.
[7] Raven ® 410 - Carbon black pigment available from Cities Service Co., Columbian Div., Akron, Ohio.
[8] Microtalc ® MP-12-50 - Magnesium silicate hydrate available from Whittaker, Clark, & Daniel Inc., South Plainfield, New Jersey.
[9] Barimite XF ® - Barium sulfate available form Cyprus Industrial Mineral Co., Cartersville, Georgia.
[10] Ti-Pure ® R902-38 - Titanium dioxide pigment available from E.I. du Pont de Nemours & Co., Wilmington, Delaware.
[11] Desmodur ® N 3200 - A hexamethylene diisocyanate biuret available from Miles Inc., Pittsburgh, Pennsylvania.

EXAMPLE 2

| Component | Weight Percent |
|---|---|
| Package 1 | |
| Acrylic amine of Example F | 40.16 |
| Solsperse 27000 | 0.37 |
| DSX-1514 | 0.35 |
| Dee Fo 97-3 | 0.11 |
| Exxate 900 | 3.03 |
| n-Propanol | 0.18 |
| Deionized water | 20.51 |
| Raven 410 | 0.04 |
| Microtalc MP-12-50 | 9.57 |
| Barimite XF | 9.89 |
| Ti-Pure R902-38 | 11.25 |
| Sub Total | 95.46 |
| Package 2 | |
| Desmodur N 3200 | 2.72 |
| Emulsifier of Example B | 1.16 |
| Exxate 900 | 0.66 |
| Sub Total | 4.54 |
| Total | 100.00 |

EXAMPLE 3

| Component | Weight Percent |
|---|---|
| Package 1 | |
| Acrylic amine of Example F | 40.16 |
| Solsperse 27000 | 0.37 |
| DSX-1514 | 0.35 |
| Dee Fo 97-3 | 0.11 |
| Exxate 900 | 3.03 |
| n-Propanol | 0.18 |
| Deionized water | 20.51 |
| Raven 410 | 0.04 |
| Microtalc MP-12-50 | 9.57 |
| Barimite XF | 9.89 |
| Ti-Pure R902-38 | 11.25 |
| Sub Total | 95.46 |
| Package 2 | |
| Desmodur N 3200 | 2.72 |
| Emulsifier of Example C | 1.21 |
| Exxate 900 | 0.61 |
| Sub Total | 4.54 |
| Total | 100.00 |

EXAMPLE 4

| Component | Weight Percent |
|---|---|
| Package 1 | |
| Acrylic amine of Example F | 40.16 |
| Solsperse 27000 | 0.37 |
| DSX-1514 | 0.35 |
| Dee Fo 97-3 | 0.11 |
| Exxate 900 | 3.03 |
| n-Propanol | 0.18 |
| Deionized water | 20.51 |
| Raven 410 | 0.04 |
| Microtalc MP-12-50 | 9.57 |
| Barimite XF | 9.89 |
| Ti-Pure R902-38 | 11.25 |
| Sub Total | 95.46 |
| Package 2 | |
| Desmodur N 3200 | 2.72 |
| Emulsifier of Example D | 1.15 |
| Exxate 900 | 0.67 |
| Sub Total | 4.54 |
| Total | 100.00 |

EXAMPLE 5

| Component | Weight Percent |
|---|---|
| Package 1 | |
| Acrylic amine of Example F | 40.16 |
| Solsperse 27000 | 0.37 |
| DSX-1514 | 0.35 |
| Dee Fo 97-3 | 0.11 |
| Exxate 900 | 3.03 |
| n-Propanol | 0.18 |
| Deionized water | 20.51 |
| Raven 410 | 0.04 |
| Microtalc MP-12-50 | 9.57 |
| Barimite XF | 9.89 |
| Ti-Pure R902-38 | 11.25 |

-continued

| Component | Weight Percent |
|---|---|
| Sub Total | 95.46 |
| Package 2 | |
| Desmodur N 3200 | 2.72 |
| Emulsifier of Example E | 1.11 |
| Exxate 900 | 0.71 |
| Sub Total | 4.54 |
| Total | 100.00 |

Examples 6 and 7 are comparative examples of coatings that do not include the emulsifiers of the present invention. Instead, Example 6 includes a commercially available, water dispersible polyisocyanate in Package 2 that does not require an emulsifier. Although the commercial polyisocyanate of Example 6 yields good coating performance as reported in Table I, it is restricted to the use of a relatively narrow selection of solvents, thus limiting adaptability of formulating coatings, and it requires solvents that make it more difficult to provide the lowest levels of VOC. Example 7 includes a conventional polyisocyanate and no emulsifier.

EXAMPLE 6

| Comparative - with water dispersible polyisocyanate | |
|---|---|
| Component | Weight Percent |
| Package 1 | |
| Acrylic amine of Example F | 40.30 |
| Solsperse 27000 | 0.37 |
| DSX-1514 | 0.35 |
| Dee Fo 97-3 | 0.11 |
| Exxate 900 | 3.02 |
| n-Propanol | 0.18 |
| Deionized water | 20.45 |
| Raven 410 | 0.04 |
| Microtalc MP-12-50 | 9.54 |
| Barimite XF | 9.86 |
| Ti-Pure R902-38 | 11.22 |
| Sub Total | 95.44 |
| Package 2 | |
| XP-7063[12] | 3.66 |
| Exxate 900 | 0.90 |
| Sub Total | 4.56 |
| Total | 100.00 |

[12]XP-7063 Water-reducible isocyanate available from Miles Inc., Pittsburgh, PA.

EXAMPLE 7

| Comparative - with no emulsifier | |
|---|---|
| Component | Weight Percent |
| Package 1 | |
| Acrylic amine of Example F | 41.85 |
| Solsperse 27000 | 0.36 |
| DSX-1514 | 0.35 |
| Dee F0 97-3 | 0.10 |
| Exxate 900 | 2.98 |
| n-Propanol | 0.17 |
| Deionized water | 20.19 |

| Comparative - with no emulsifier | |
|---|---|
| Component | Weight Percent |
| Raven 410 | 0.04 |
| Microtalc MP-12-50 | 9.42 |
| Barimite XF | 9.73 |
| Ti-Pure R902-38 | 11.07 |
| Sub Total Package 2 | 96.27 |
| Desmodur N 3200 | 2.84 |
| Exxate 900 | 0.89 |
| Sub Total | 3.73 |
| Total | 100.00 |

Example 8 illustrates the alternative three component embodiment of the present invention. Example 9 is also a three component coating, but with no emulsifier for comparison purposes.

EXAMPLE 8

| Three component coating with emulsifier | |
|---|---|
| Component | Weight Percent |
| Package 1 | |
| Anionic acrylic polyol[13] | 25.30 |
| Emulsifier of Example A | 3.44 |
| Dibutyl tin diacetate[14] | 0.17 |
| Tinuvin 384[15] | 1.03 |
| Tinuvin 123[16] | 0.69 |
| FC-431 fluorosurfactant[17] | 0.07 |
| Butyl Cellosolve acetate[18] | 3.44 |
| Sub Total Package 2 | 34.14 |
| Cythane 3160[19] | 14.23 |
| Package 3 | |
| Deionized water | 51.62 |
| Total | 100.00 |

[13]Anionic acrylic polyol is a 70% resin solids, water reducible copolymer supplied in butyl Cellosolve ® acetate and neutralized with triethylamine. It is composed of 19.0% isobutyl methacrylate, 50.0% butyl acrylate, 6.0% acrylic acid, and 25.0% hydroxyethyl methacrylate.
[14]Dibutyl tin diacetate is available from Air Products and Chemicals Inc., Allentown, Pennsylvania.
[15]Tinuvin ® 384 is an ultraviolet radiation absorber available from Ciba-Geigy Corp., Hawthorne, New York.
[16]Tinuvin ® 123 is a hindered amine light stabilizer available from Ciba-Geigy Corp., Hawthorne, New York.
[17]FC-431 is a flourosurfactant available from 3M Corp., Specialty Chemicals Division, St Paul, Minnesota.
[18]Butyl Cellosolve ® acetate is ethylene glycol monobutyl ether acetate and is available from Union Carbide Corp., New York, New York.
[19]Cythane ® 3160 is an aliphatic polyisocyanate resin supplied by Cytec Industries Inc., Stamford, Connecticut.

EXAMPLE 9

| (Comparative three component coating without emulsifier) | |
|---|---|
| Component | Weight Percent |
| Package 1 | |
| Anionic acrylic polyol | 28.30 |

| (Comparative three component coating without emulsifier) | |
|---|---|
| Component | Weight Percent |
| Dibutyl tin diacetate | 0.17 |
| Tinuvin 384 | 1.03 |
| Tinuvin 123 | 0.69 |
| FC-431 fluorosurfactant | 0.07 |
| Butyl Cellosolve acetate | 2.24 |
| Sub Total Package 2 | 32.50 |
| Cythane 3160 | 15.92 |
| Package 3 | |
| Deionized water | 51.68 |
| Total | 100.00 |

Test Procedures

Each of the coating formulations of Examples 1–7 was tested for performance by application onto a substrate prepared as follows:

The coating compositions of the examples were prepared as two-package compositions with the functional acrylic, pigments, and additives in one package (Package 1) and the isocyanate, isocyanate emulsifier, and solvent in a second package (Package 2). In an appropriate grinding vessel, Package 1 was prepared by mixing the pigments into the resinous vehicle components under high speed agitation with a Cowles blade. After stirring for 5 minutes the Cowles blade was replaced with an Impellar blade, and zircoa beads were then added. This mix was stirred at high speed for 1 hour, after which the beads were separated from the grind paste. The isocyanate package was prepared by blending the isocyanate, isocyanate emulsifier, and solvent in a separate container, which was hand-shaken until a homogeneous solution resulted. Before spray application, the Package 2 was added to Package 1 with slow and constant agitation.

The substrate for each example was 32 gauge steel panels with a zinc phosphate pretreatment (available from Advanced Coating Technologies, Inc., Hillsdale, Mich.; as cold roll steel B952 P60 DIW, polish) primed with an epoxy-polyamide metal primer, DP-40/DP-401 (a metal primer made by mixing 1 volume DP-40 epoxy primer with 1 volume DP-401 epoxy primer catalyst, both available from PPG Industries, Inc., Pittsburgh, Pa.). The primed substrates were air-dried under ambient conditions for at least 1 hour before the example coatings were applied.

Each blended coating example was applied by air-atomized spray at 45 pounds per square inch over the previously prepared substrates. Each coated substrate was air-dried under ambient conditions for 1 hour. Spray Application was evaluated as follows: good atomization from the spray gun was designated as "pass"; poor paint atomization in which the paint partially clogged the spray gun was designated as "fail." In rating panel appearance, a smooth, continuous film was designated as "pass" and a textured, discontinuous film was designated as "fail."

Each coated panel was dry-sanded with P400 grit sandpaper (P400-213Q, Imperial Wetordry® production paper, "A" weight, available from 3M, St. Paul, Minn. Sanded coating that powdered without fouling the sandpaper with grit was designated as "pass." Sanded coating that powdered and fouled the sandpaper with grit was designated as "fail."

Potlife of the example coatings was evaluated as follows: a coating that remained liquid after 1 hour after blending the two components and remained a viscous liquid after 24 hours was designated as "pass." A coating that had liquid with floating oil droplets after 1 hour and a solid crust over liquid after 24 hours was designated as "fail."

TABLE I

COATING PERFORMANCE RESULTS

| Example | Spray Application | Panel Appearance | Sanding | Potlife |
|---|---|---|---|---|
| Example 1 | Pass | Pass | Pass | Pass |
| Example 2 | Pass | Pass | Pass | Pass |
| Example 3 | Pass | Pass | Pass | Pass |
| Example 4 | Pass | Pass | Pass | Pass |
| Example 5 | Pass | Pass | Pass | Pass |
| Example 6 | Pass | Pass | Pass | Pass |
| Example 7 | Fail | Fail | Fail | Fail |

The coating compositions of Examples 8 and 9 were prepared as three package compositions with the polyol, emulsifier, additives and catalyst in Package 1. Package 2 was comprised of the isocyanate crosslinker, and Package 3 was the aqueous diluent. The ingredients of Package 1 were preblended to a homogeneous consistency by mechanical mixing. Package 2 was added to Package 1 immediately before the coating was to be applied and stirred by hand until well mixed. Finally, the water was slowly added to the premixed resin and crosslinker blend with stirring until a sprayable viscosity was obtained and the isocyanate was completely emulsified within the resins.

The preparation of the substrate panels for testing Examples 8 and 9 was similar to Examples 1–7, with the exception that the primed panels were painted with a black acrylic basecoat DBU-9300/DRR-1170 (an acrylic basecoat made by mixing 1 volume of DBU-9300 acrylic basecoat color with 1.5 volumes or DRR-1170 reactive reducer available from PPG Industries, Inc., Pittsburgh, Pa.). The coatings of Examples 8–9 were applied by air-atomized spray at 50 pounds per square inch over the previously prepared substrates. All results reported in Table II were after 7 days cure at ambient temperature.

TABLE II

COATING PERFORMANCE RESULTS

| Example | Gloss | Pencil Hardness | Sward Hardness | Humidity Gloss | Humidity Appearance |
|---|---|---|---|---|---|
| Example 8 | 82 | HB | 18 | 81 | Good |
| Example 9 | 82 | HB | 16 | 83 | Severe blushing |

In Table II, gloss refers to the topcoat gloss and was measured in accordance with ASTM D 523 using a 20 degree gloss meter. Gloss is reported in terms of percent reflected light.

The pencil hardness tests were conducted in accordance with ASTM D 3363. Wood was stripped from pencil of varying hardness, leaving the full diameter of lead exposed to a length of ¼ inch to ⅜ inch. The end of the lead was flattened at 90 degrees to the pencil axis, and holding the pencil at 45 degrees to the film surface, the pencil is pushed forward about ¼ inch using as much downward pressure as can be applied without breaking the lead. The result is reported as the highest pencil hardness that produced no rupture of the film. The scale of pencil hardness, from softest to hardest, is as follows:

6B, 5B, 4B, 3B, 2B, B, HB, F, H, 2H, 3H, 4H, 5H, 6H, 7H, 8H, 9H, 10H.

Sward Hardness is determined by using a Sward hardness tester available from the Paul N. Gardner Company, Pompano Beach, Fla. The reported values are the number of ocillations of the testing device on the coated surface multiplied by two. A higher Sward number indicates a harder coating.

Humidity refers to humidity testing conducted as per ASTM Method D-2247-68. Humidity results were recorded after a seven day cure at ambient temperature and four days at 100% relative humidity at about 38° C.

The invention has been described in connection with specific embodiments in order to prove the best mode of the invention, but it should be understood that other variations and modifications as are known to those of skill in the art may be resorted to without departing from the scope of the invention as defined by the claims which follow.

We claim:

1. An emulsifier having a number average molecular weight ranging from about 1000 to about 4000, said emulsifier comprising the reaction product of:
   (a) an isocyanate component comprising an isocyanate oligomer having at least two free isocyanate groups, and
   (b) a hydroxy functional polyalkyl ether component present in an amount sufficient to react with all of the isocyanate oligomer's free isocyanate groups, said hydroxy functional polyalkyl ether component comprising at least one mono-hydroxy functional polyalkyl ethers containing at least five ethylene oxide groups.

2. An emulsifier having a number average molecular weight ranging from about 1000 to about 4000, said emulsifier comprising the reaction product of:
   (a) an isocyanate component comprising an isocyanate oligomer having at least two free isocyanate group, and
   (b) a defunctionalizing component present in an amount sufficient to react with all of the isocyanate oligomer's free isocyanate groups, said defunctionalizing component comprising:
      (i) a mono-hydroxy functional polyalkyl ethers containing at least five ethylene oxide groups, wherein said mono-hydroxy functional polyalkyl ether is present in an amount sufficient to react with at least one equivalent of the isocyanate oligomer's isocyanate groups, and
      (ii) at least one reactant selected from the group consisting of:
         a. mono-hydroxy functional alcohols,
         b. mono-hydroxy functional glycol ethers different from said mono-hydroxy functional polyalkyl ethers, and
         c. amine compounds having an active amine hydrogen reactive with at least one equivalent of the isocyanate oligomer's free isocyanate groups.

3. A water dispersible polyisocyanate composition, said water dispersible polyisocyanate composition comprising:
   (a) a first isocyanate component comprising a first isocyanate oligomer having at least two free isocyanate groups, and
   (b) an emulsifier component having a number average molecular weight ranging from about 1000 to about 4000, said emulsifier comprising the reaction product of:
      (i) a second isocyanate component comprising a second isocyanate oligomer having at least two free isocyanate groups, and
      (ii) a hydroxy functional polyalkyl ether component present in an amount sufficient to react with all of the second isocyanate oligomer's free isocyanate groups, said hydroxy functional polyalkyl ether component comprising at least one mono-hydroxy functional polyalkyl ethers containing at least five ethylene oxide groups.

4. A water dispersible polyisocyanate composition, said water dispersible polyisocyanate composition comprising:
(a) a first isocyanate component comprising a first isocyanate oligomer having at least two free isocyanate groups, and
(b) an emulsifier component having a number average molecular weight ranging from about 1000 to about 4000, said emulsifier comprising the reaction product of:
(i) a second isocyanate component comprising a second isocyanate oligomer having at least two free isocyanate group, and
(ii) a defunctionalizing component present in an amount sufficient to react with all of the second isocyanate oligomer's free isocyanate groups, said defunctionalizing component comprising:
a. a mono-hydroxy functional polyalkyl ethers containing at least five ethylene oxide groups, wherein said mono-hydroxy functional polyalkyl ether is present in an amount sufficient to react with at least one equivalent of the second isocyanate oligomer's isocyanate groups, and
b. at least one reactant selected from the group consisting of:
i. mono-hydroxy functional alcohols,
ii. mono-hydroxy functional glycol ethers different from said mono-hydroxy functional polyalkyl ethers, and
iii. amine compounds having an active amine hydrogen reactive with at least one equivalent of the second isocyanate oligomer's free isocyanate groups.

5. An aqueous two-component coating composition comprising:
(a) a water dispersible polyisocyanate composition, wherein said water dispersible polyisocyanate composition comprises:
(i) a first isocyanate component comprising a first isocyanate oligomer having at least two free isocyanate groups, and
(ii) an emulsifier component having a number average molecular weight ranging from about 1000 to about 4000, said emulsifier comprising the reaction product of:
a. a second isocyanate component comprising a second isocyanate oligomer having at least two free isocyanate groups, and
b. a hydroxy functional polyalkyl ether component present in an amount sufficient to react with all of the second isocyanate oligomer's free isocyanate groups, said hydroxy functional polyalkyl ether component comprising at least one mono-hydroxy functional polyalkyl ethers containing at least five ethylene oxide groups; and
(b) an aqueous polymer resin that contains isocyanate-reactive groups, wherein the water dispersible polyisocyanate composition and the aqueous polymer resin are present in the two-component coating composition in an amount sufficient to provide an equivalent ratio of isocyanate groups to isocyanate-reactive groups in the aqueous polymer resin of 0.5:1 to 5:1.

6. An aqueous two-component coating composition comprising:
(a) a water dispersible polyisocyanate composition, wherein said water dispersible polyisocyanate composition comprises:
(i) a first isocyanate component comprising a first isocyanate oligomer having at least two free isocyanate groups, and
(ii) an emulsifier component having a number average molecular weight ranging from about 1000 to about 4000, said emulsifier comprising the reaction product of:
a. a second isocyanate component comprising a second isocyanate oligomer having at least two free isocyanate group, and
b. a defunctionalizing component present in an amount sufficient to react with all of the second isocyanate oligomer's free isocyanate groups, said defunctionalizing component comprising:
i. a mono-hydroxy functional polyalkyl ethers containing at least five ethylene oxide groups, wherein said mono-hydroxy functional polyalkyl ether is present in an amount sufficient to react with at least one equivalent of the second isocyanate oligomer's isocyanate groups, and
ii. at least one reactant selected from the group consisting of:
a) mono-hydroxy functional alcohols,
b) mono-hydroxy functional glycol ethers different from said mono-hydroxy functional polyalkyl ethers, and
c) amine compounds having an active amine hydrogen reactive with at least one equivalent of the second isocyanate oligomer's free isocyanate groups; and
(b) an aqueous polymer resin that contains isocyanate-reactive groups, wherein the water dispersible polyisocyanate composition and the aqueous polymer resin are present in the two-component coating composition in an amount sufficient to provide an equivalent ratio of isocyanate groups to isocyanate-reactive groups in the aqueous polymer resin of 0.5:1 to 5:1.

7. The emulsifier of claim 1 wherein the isocyanate oligomer is an isocyanurate.

8. The emulsifier of claim 7 where in the isocyanurate is based on isophorone diisocyanate.

9. The emulsifier of claim 1 wherein the hydroxy functional polyalkyl ether component consists essentially of said mono-hydroxy functional polyalkyl ethers containing at least five ethylene oxide groups.

10. The emulsifier of claim 2 wherein the defunctionalizing component consists essentially of said mono-hydroxy functional polyalkyl ethers containing at least five ethylene oxide groups and at least one reactant selected from the group consisting of:
(a) mono-hydroxy functional alcohols, and
(b) mono-hydroxy functional glycol ethers different from said mono-hydroxy functional polyalkyl ethers.

11. The emulsifier of claim 2 wherein the defunctionalizing component comprises said mono-hydroxy functional polyalkyl ether containing at least five ethylene oxide groups; and at least two reactants selected from the group consisting of:
(a) a mono-hydroxy functional alcohol;
(b) a mono-hydroxy functional glycol ether different from said mono-hydroxy functional polyalkyl ethers; and
(c) an amine compound having an active amine hydrogen reactive with at least one equivalent of the isocyanate oligomer's free isocyanate groups.

12. The polyisocyanate composition of claim 3 wherein the first isocyanate component is a biuret.

13. The polyisocyanate composition of claim 3 wherein the first isocyanate component is an isocyanurate.

14. The polyisocyanate composition of claim 13 wherein the isocyanurate is based on isophorone diisocyanate.

15. The polyisocyanate composition of claim 3 wherein the first isocyanate component is an isocyanurate.

16. The polyisocyanate composition of claim 15 wherein the isocyanurate is based on isophorone diisocyanate.

17. The polyisocyanate composition of claim 4 wherein the defunctionalizing component consists essentially of said mono-hydroxy functional polyalkyl ethers containing at least five ethylene oxide groups.

18. The polyisocyanate composition of claim 4 wherein the defunctionalizing component consists essentially of said mono-hydroxy functional polyalkyl ethers containing at least five ethylene oxide groups and at least one reactant selected from the group consisting of:

(a) mono-hydroxy functional alcohols, and (b) mono-hydroxy functional glycol ethers different from said mono-hydroxy functional polyalkyl ethers.

19. The polyisocyanate composition of claim 4 wherein the defunctionalizing component comprises said mono-hydroxy functional polyalkyl ether containing at least five ethylene oxide groups; and at least two reactants selected from the group consisting of:

(a) a mono-hydroxy functional alcohol;

(b) a mono-hydroxy functional glycol ether different from said mono-hydroxy functional polyalkyl ethers; and (c) an amine compound having an active amine hydrogen reactive with at least one equivalent of the isocyanate oligomer's free isocyanate groups.

20. The polyisocyanate composition of claim 3 wherein the emulsifier component is present in an amount of from 15 to 40 percent, based on the total weight of the first isocyanate component and the emulsifier component.

21. The two-component coating composition of claim 5 wherein the first isocyanate component is a biuret.

22. The coating composition of claim 5 wherein the first isocyanate component is an isocyanurate.

23. The coating composition of claim 22 wherein the isocyanurate is based on isophorone diisocyanate.

24. The coating composition of claim 6 wherein the defunctionalizing component consists essentially of said mono-hydroxy functional polyalkyl ethers containing at least five ethylene oxide groups.

25. The coating composition of claim 6 wherein the defunctionalizing component consists essentially of said mono-hydroxy functional polyalkyl ethers containing at least five ethylene oxide groups and at least one reactant selected from the group consisting of:

(a) mono-hydroxy functional alcohols, and (b) mono-hydroxy functional glycol ethers different from said mono-hydroxy functional polyalkyl ethers.

26. The coating composition of claim 6 wherein the defunctionalizing component comprises said mono-hydroxy functional polyalkyl ether containing at least five ethylene oxide groups; and at least two reactants selected from the group consisting of:

(a) a mono-hydroxy functional alcohol;

(b) a mono-hydroxy functional glycol ether different from said mono-hydroxy functional polyalkyl ethers; and (c) an amine compound having an active amine hydrogen reactive with at least one equivalent of the isocyanate oligomer's free isocyanate groups.

27. The coating composition of claim 5 wherein the emulsifier component is present in an amount of from 15 to 40 percent, based on the total weight of the first isocyanate component and the emulsifier component.

28. The coating composition of claim 5 wherein the aqueous polymer resin is an acrylic polymer having amine functionality.

29. The coating composition of claim 5 wherein the polyisocyanate composition and the aqueous polymer resin are present in an amount sufficient to provide an equivalent ratio of isocyanate groups in the first isocyanate component to isocyanate-reactive groups in the aqueous polymer resin of about 0.8:1 to 2:1.

* * * * *